United States Patent
Ito et al.

(10) Patent No.: US 12,218,604 B2
(45) Date of Patent: Feb. 4, 2025

(54) POWER CONVERTER, POWER CONVERSION CONTROLLER, AND CONTROL METHOD

(71) Applicant: TMEIC Corporation, Chuo-ku (JP)

(72) Inventors: Takumi Ito, Tokyo (JP); Kentaro Nabeshima, Tokyo (JP); Masashi Nakamura, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 81 days.

(21) Appl. No.: 17/995,941

(22) PCT Filed: May 21, 2020

(86) PCT No.: PCT/JP2020/020172
§ 371 (c)(1),
(2) Date: Oct. 11, 2022

(87) PCT Pub. No.: WO2021/234923
PCT Pub. Date: Nov. 25, 2021

(65) Prior Publication Data
US 2023/0208308 A1    Jun. 29, 2023

(51) Int. Cl.
H02M 5/458    (2006.01)

(52) U.S. Cl.
CPC .................. H02M 5/458 (2013.01)

(58) Field of Classification Search
CPC ..... H02M 5/458; H02M 7/219; H02M 1/0025
See application file for complete search history.

(56) References Cited

U.S. PATENT DOCUMENTS

| 10,848,065 | B2* | 11/2020 | Kawai | H02M 7/219 |
| 2015/0280612 | A1* | 10/2015 | Ide | H02M 7/5395 363/98 |
| 2016/0156262 | A1* | 6/2016 | Kelly | H02M 1/36 323/285 |

FOREIGN PATENT DOCUMENTS

| CN | 104734481 A | 6/2015 |
| JP | 7-9602 B2 | 2/1995 |
| JP | 5407322 82 | 2/2014 |
| RU | 2 628 757 C1 | 8/2017 |

(Continued)

OTHER PUBLICATIONS

International Search Report issued Aug. 18, 2020 in PCT/JP2020/020172 filed on May 21, 2020, citing document 16 therein, 4 pages (with English Translation).

(Continued)

*Primary Examiner* — Kyle J Moody
(74) *Attorney, Agent, or Firm* — Oblon, McClelland, Maier & Neustadt, L.L.P.

(57) ABSTRACT

A power converter includes a converter, an inverter, and a control unit. The converter converts electric power supplied from a power supply side to DC power. The inverter is provided on an output side of the converter. The control unit is configured to calculate a control difference between a target value for a target control voltage in a DC section provided on the output side of the converter and a feedback value using a DC voltage of the DC section as the feedback value, to perform a nonlinear operation process on the control difference, and to calculate an operation value based on a result of the nonlinear operation process and control the converter using the operation value.

6 Claims, 7 Drawing Sheets

(56) References Cited

FOREIGN PATENT DOCUMENTS

WO    WO 2019/012725 A1    1/2019

OTHER PUBLICATIONS

Combined Chinese Office Action and Search Report issued Apr. 11, 2024 in Chinese Patent Application No. 202080046958.8 (with unedited computer-generated English Translation), citing reference 15 therein, 15 pages.

Indian Office Action issued in India Patent Application No. 202217057498 on Aug. 12, 2024, (w/ English Translation), citing documents 15-16 therein.

* cited by examiner

POWER CONVERTER, POWER CONVERSION CONTROLLER, AND CONTROL METHOD

TECHNICAL FIELD

The present invention relates to a power converter, a power conversion controller, and a control method.

BACKGROUND ART

A power converter including a converter and an inverter in a main circuit thereof is known. Such a power converter converts electric power which is relayed via a DC section provided between the converter and the inverter. A voltage in the DC section is adjusted by controlling the converter. When a load of the inverter fluctuates relatively largely while the power converter is operating, the voltage in the DC section may fluctuate relatively largely due to its influence.

CITATION LIST

Patent Literature

[Patent Literature 1]
Japanese Examined Patent Application, Second Publication No. H7-9602

SUMMARY OF INVENTION

Technical Problem

An objective of the invention is to provide a power converter, a power conversion controller, and a control method that can reduce fluctuation in a DC voltage on an output side of a converter which is caused due to fluctuation in load of an inverter.

Solution to Problem

A power converter according to an embodiment includes a converter, an inverter, and a control unit. The power converter converts electric power supplied from a power supply side to DC power. The inverter is provided on an output side of the converter. The control unit is configured to calculate a control difference between a target value for a target control voltage in a DC section provided on the output side of the converter and a feedback value using a DC voltage of the DC section as the feedback value, to perform a nonlinear operation process on the control difference, to calculate an operation value based on a result of the nonlinear operation process, and to control the converter using the operation value.

DESCRIPTION OF EMBODIMENTS

Hereinafter, a power converter, a power conversion controller, and a control method according to an embodiment will be described with reference to the accompanying drawings. In the following description, elements having the same or similar functions will be referred to by the same reference signs. Repeated description of such elements may be omitted. Electrical connection may be simply referred to as "connection." An "orthogonal" relation described below includes a substantially orthogonal relation. An "equal magnitude" includes a substantially equal magnitude.

First Embodiment

Figure 1:
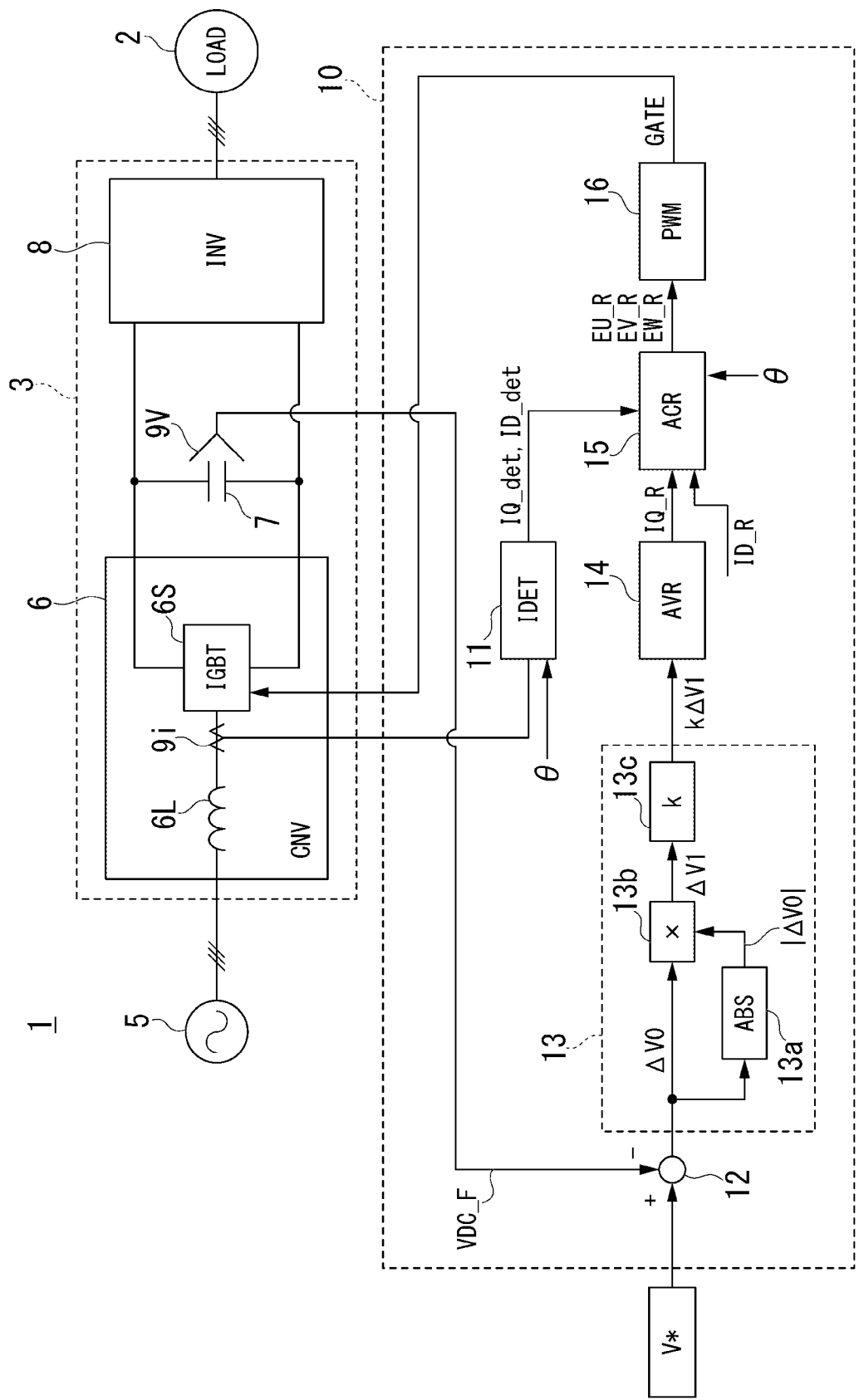
FIG. 1 is a diagram illustrating a configuration of a power converter according to a first embodiment.

FIG. 1 is a diagram illustrating a configuration of a power converter 1 according to a first embodiment.

The power converter 1 includes, for example, a main circuit 3 that supplies electric power to a load 2 (LOAD in the drawing), a voltage sensor 9V, a current sensor 9i, and a control unit 10. Three-phase AC power from a power supply 5 is shared by an input side of the main circuit 3.

For example, the main circuit 3 includes a converter 6 (CNV in the drawing), a capacitor 7, and an inverter 8 (INV in the drawing).

The converter 6 converts electric power which is supplied from a power supply 5 side to DC power. A DC section is provided on an output side of the converter 6. A smoothing capacitor 7 and an input of the inverter 8 are connected in parallel to the output of the converter 6 via the DC section. The capacitor 7 may be provided independently from the converter 6 and the inverter 8, may be a part of the converter 6 or the inverter 8, or may be a combination thereof. The inverter 8 is supplied with electric power from the converter 6 via the DC section. As described above, the main circuit 3 converts electric power which is supplied via the DC section. The voltage sensor 9V detects a voltage of the DC section. The current sensor 9i detects a current flowing in the input of the converter 6.

For example, the converter 6 includes a reactor 6L and an IGBT 6S. The reactor 6L is provided to correspond to phases of a three-phase alternating current. One end of the reactor 6L is connected to an input terminal of the converter 6 and is connected to the power supply 5 via the input terminal (not illustrated) of the converter 6. The other end of the reactor 6L is connected to a control terminal of the IGBT 6S.

The IGBT 6S includes one or more semiconductor switches and converts AC power supplied via the reactor 6L to DC power by turning the semiconductor switch on/off using a control signal supplied to the control terminal.

The control unit 10 calculates an operation value based on a result of a nonlinear operation process and controls the converter 6 using the operation value. For example, the control unit 10 calculates a control difference between a target value V* for a target control voltage in the DC section and a feedback value VDC_F using a voltage (a DC voltage) in the DC section detected by the voltage sensor 9V as the feedback value, and performs a nonlinear operation process on the control difference.

An example of a specific configuration of the control unit 10 will be described below.

The control unit 10 includes, for example, a current detecting unit 11 (IDET in the drawing), a subtractor 12, a nonlinear operation unit 13, a voltage control unit 14 (AVR in the drawing), a current control unit 15 (ACR in the drawing), and a PWM control unit 16 (PWM in the drawing).

The current detecting unit 11 calculates detected current values ID_det and IQ_det based on a detection value of an input current of the converter 6 detected by the current sensor 9$i$ and a reference phase θ. For example, the current detecting unit 11 converts a stationary coordinate system of UVW phases to a rotary coordinate system including a D axis and a Q axis based on detection values of currents of two or more phases of the three-phase alternating current on the input side of the converter 6 using the reference phase θ as a phase of reference, and calculates the detected current values ID_det and IQ_det. The reference phase θ is a phase signal synchronized with a phase of an alternating current supplied to the converter 6 and is generated, for example, based on a phase of the alternating current by a phase detector which is not illustrated.

For example, the subtractor 12 acquires a control difference ΔV0 between a target value V* for the target control voltage in the DC section designated by a host device and a feedback value VDC_F by subtracting the feedback value VDC_F from a voltage (a DC voltage) in the DC section detected by the voltage sensor 9V from the target value V*.

The nonlinear operation unit 13 calculates a control difference kΔV1 by performing a nonlinear operation and a linear operation of a magnification k on the control difference ΔV0 in accordance with a predetermined rule using the control difference ΔV0 between the target value V* and the feedback VDC_F as an input variable.

For example, the nonlinear operation unit 13 includes operation units 13$a$, 13$b$, and 13$c$.

The operation unit 13$a$ (ABS in the drawing) calculates an absolute value of the control difference ΔV0. The operation unit 13$b$ is a multiplier and calculates a control difference ΔV1 by multiplying the control difference ΔV0 by an absolute value (|ΔV0|) of the control difference ΔV0 using the absolute value (|ΔV0|) of the control difference ΔV0 as an input variable. The operation unit 13$c$ calculates a control difference kΔV1 by multiplying the control difference ΔV1 by a coefficient k of which the value is determined in advance. This operation process is arranged in Equations (1) and (2).

$$\Delta V1 = \Delta V0 \times |\Delta V0| \quad (1)$$

$$k\Delta V1 = k \times \Delta V1 \quad (2)$$

The voltage control unit 14 calculates a current reference IQ_R of a value at which the control difference kΔV1 calculated by the nonlinear operation unit 13 is 0. This corresponds to acquiring a current reference IQ_R of a value at which the control difference ΔV1 is 0. The current reference IQ_R is a target control value for defining a magnitude of an active current. A proportional element (P), an integral element (I), and a differential element (D) have only to be connected in parallel to each other. For example, the voltage control unit 14 calculates the current reference IQ_R through a PID operation process including the proportional element (P), the integral element (I), and the differential element (D). In the voltage control unit 14, the control difference ΔV1 is commonly supplied to the inputs of the proportional element (P), the integral element (I), and the differential element (D).

An operation process which is performed by the voltage control unit 14 is not limited to the PID operation process. The operation process which is performed by the voltage control unit 14 may be an operation process including at least one operation elements of the proportional element (P), the integral element (I), and the differential element (D) instead of the PID operation process.

The current control unit 15 calculates voltage references EU_R, EV_R, and EW_R corresponding to the phases of an alternating current based on the current reference ID_R which is not illustrated, the current reference IQ_R calculated by the voltage control unit 14, the detected current values ID_det and IQ_det calculated by the current detecting unit 11, and the reference phase θ. The current reference ID_R is a target control value for defining a magnitude of a reactive current and may be, for example, a predetermined constant.

For example, the current control unit 15 calculates the voltage reference VD_R such that a difference between the current reference ID_R and the detected current value ID_det is 0 for a D-axis component. The current control unit 15 calculates the voltage reference VD_R such that a difference between the current reference IQ_R and the detected current value ID_det is 0 for a Q-axis component. The current control unit 15 converts a rotary coordinate system including the D axis and the Q axis to a stationary coordinate system including the axes of UVW phases using the reference phase θ based on the voltage reference VD_R of the D-axis component and the voltage reference VD_R of the Q-axis component.

The PWM control unit 16 generates gate pulses (GATE) for controlling currents flowing in the phases of an alternating current using a carrier signal which is not illustrated based on the voltage references EU_R, EV_R, and EW_R calculated by the current control unit 15. The PWM control unit 16 adjusts the currents of the phases of the alternating current by supplying the gate pulses (GATE) of the phases to the control terminal of the IGBT 6S of the converter 6 and turning on/off the IGBT 6S.

The control unit 10 of the power converter 1 having the aforementioned configuration may control the main circuit 3 as will be described below.

For example, the control unit 10 calculates a control difference ΔV0 between a target value V* for a target control voltage in a DC section provided on the output side of the converter 6 and a feedback value VDC_F using the feedback value VDC_F using a DC voltage of the DC section as the feedback value VDC_F, and performs a nonlinear operation process on the control difference ΔV0. The control unit 10 calculates an operation value based on the result of the nonlinear operation process and controls the converter 6 using the operation value. The control unit 10 acquires a product of an absolute value (|ΔV0|) of the control difference and the control difference ΔV0 through the nonlinear operation process on the control difference ΔV0 and sets the product as the result of the nonlinear operation process.

Figure 2:
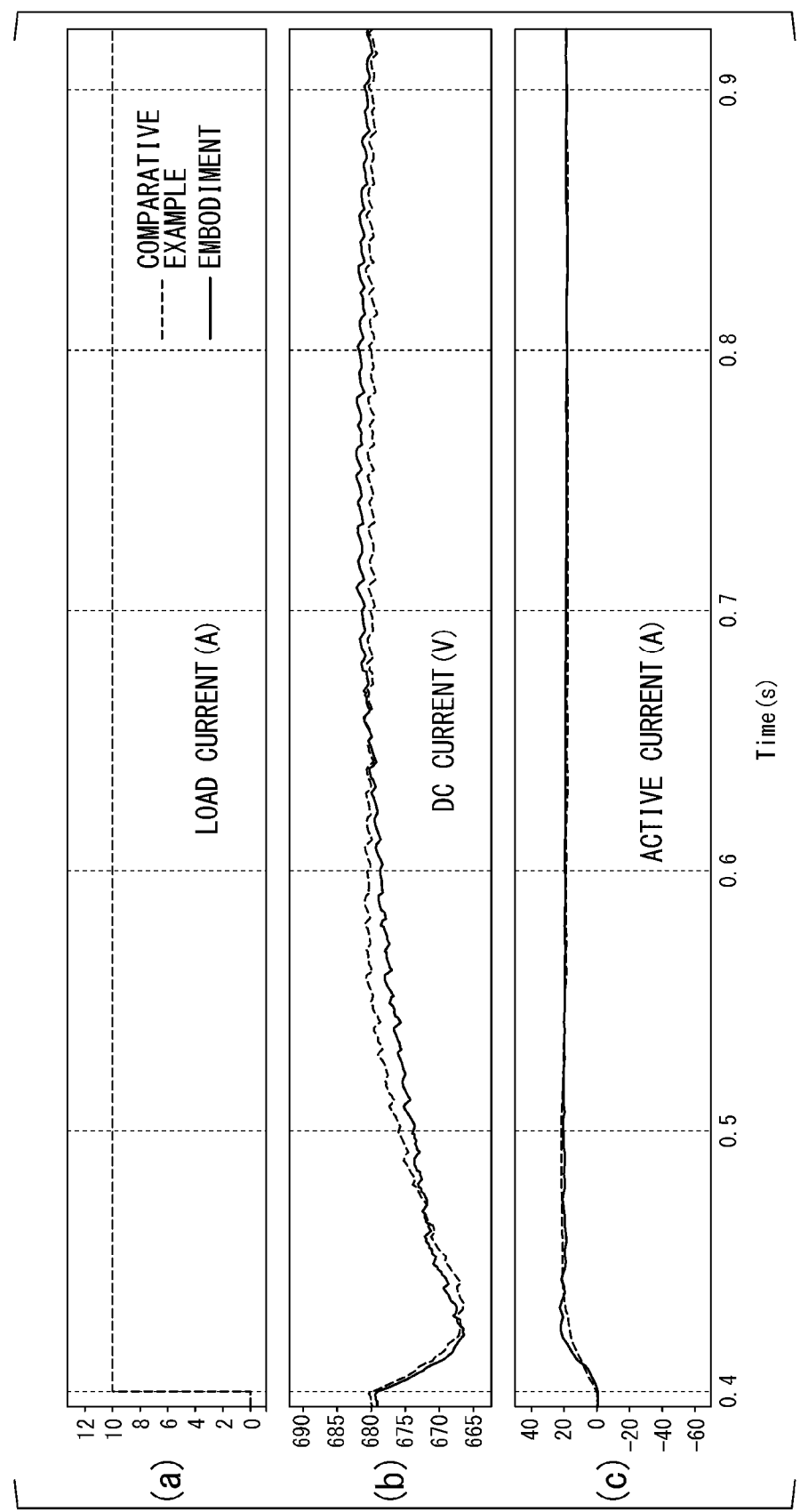
FIG. 2 is a diagram illustrating an analysis result of voltage control according to the first embodiment.
Figure 3:
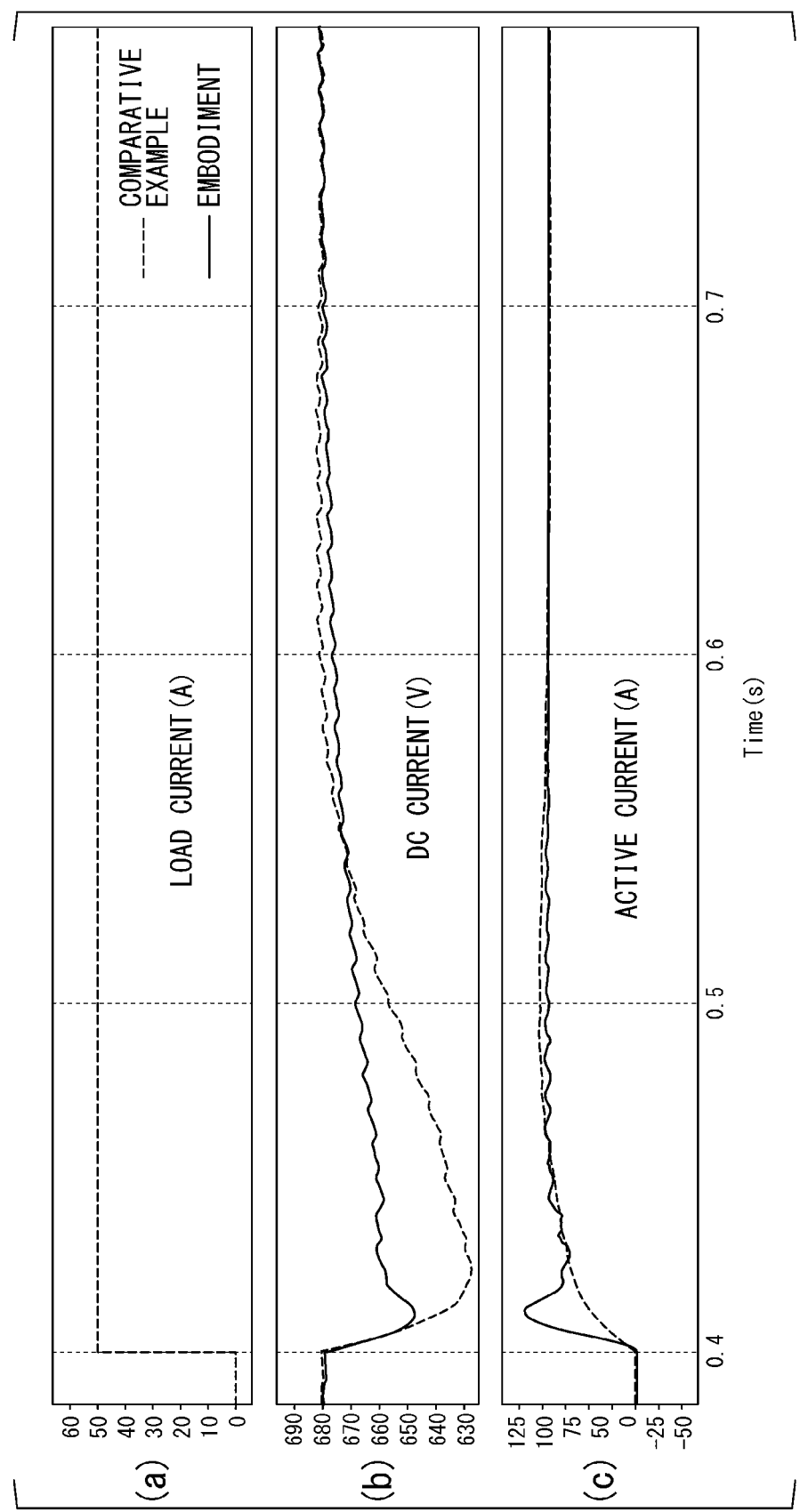
FIG. 3 is a diagram illustrating an analysis result of voltage control according to the first embodiment.
Figure 4:
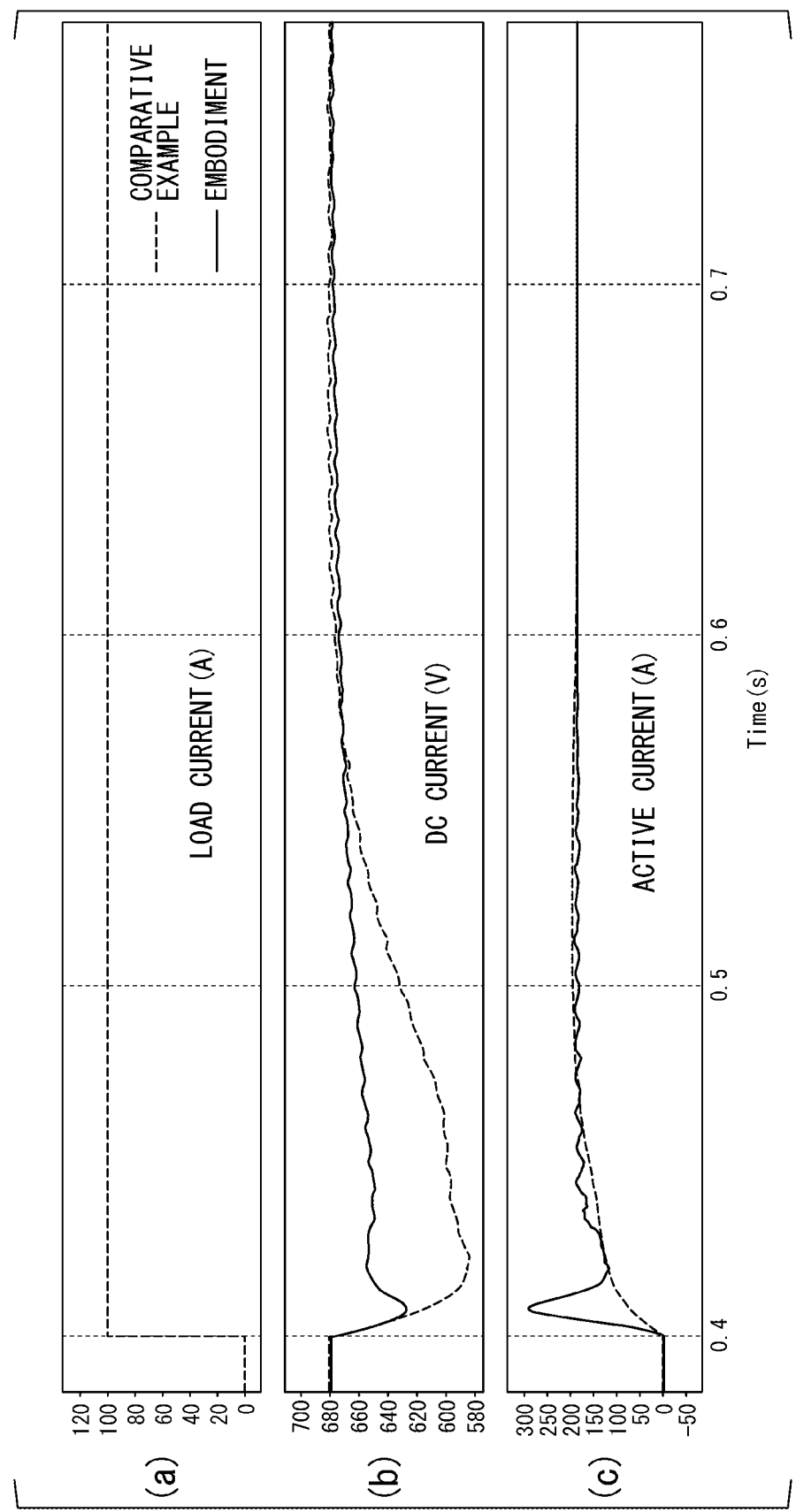
FIG. 4 is a diagram illustrating an analysis result of voltage control according to the first embodiment.

Analysis results of voltage control according to the first embodiment will be described below with reference to FIGS. 2 to 4. FIGS. 2 to 4 are diagrams illustrating the analysis results of voltage control according to the first embodiment.

The graph illustrated in a portion (a) of FIG. 2 represents fluctuation of a load current (amperes). The graph illustrated in a portion (b) of FIG. 2 represents fluctuation of a voltage (volts, also referred to as a DC voltage) of the DC section. The graph illustrated in a portion (c) of FIG. 2 represents fluctuation of an estimated value (amperes) of an active current flowing in an AC side of the converter 6.

The voltage control unit 14 according to this embodiment is configured to calculate a current reference IQ_R, for example, through a PI operation process including a proportional element (P) and an integral element (I) on the control difference kΔV1 which is an operation result of the nonlinear operation unit 13.

On the other hand, a power converter according to a comparative example does not include the nonlinear operation unit 13 in the power converter according to this embodiment. A voltage control unit of the power converter according to the comparative example calculates the current reference IQ_R through the PI operation process similarly to the voltage control unit 14 according to this embodiment.

In the analysis based on different conditions illustrated in FIGS. 2 to 4, an initial state of the analysis process is shared. For example, the DC voltage of about 680 volts is charged as illustrated in the portion (b) of FIG. 2, and the load current flowing in the load 2 is zero amperes as illustrated in the portion (a) of FIG. 2. At this time, since the load 2 is in a load-less state, the value of the active current is substantially 0 amperes as illustrated in the portion (c) of FIG. 2.

The analysis results illustrated in FIGS. 2 to 4 are a difference in an amount of fluctuation due to fluctuation of the load 2 in the initial state. The amount of fluctuation of the load 2 increases in the order of FIGS. 2, 3, and 4. The initial states in the graphs illustrated in FIGS. 3 and 4 are the same as illustrated in FIG. 2.

For example, when the amount of fluctuation is the smallest as illustrated in FIG. 2, a load current flowing in the load 2 fluctuates stepwise from 0 amperes to 10 amperes. For example, when this fluctuation occurs at the timing of 0.4 seconds, the DC voltage decreases suddenly from about 680 volts to about 667 volts as illustrated in the portion (b) of FIG. 2 with this fluctuation and then increases to approach a steady-state value until the active current changes from 0 amperes to 20 amperes which is a steady-state value as illustrated in the portion (c) of FIG. 2. In this case, a rate of fluctuation of the DC voltage from an initial-state voltage is about 2% at a bottom value.

In the graphs illustrated in FIG. 2, the fluctuation of the DC voltage illustrated in the portion (b) of FIG. 2 and the fluctuation of the active current illustrated in the portion (c) of FIG. 2 have a difference in the course of status transition but have similar fluctuation trends.

On the other hand, when the amount of fluctuation is the second largest as illustrated in FIG. 3, a load current flowing in the load 2 fluctuates stepwise from 0 amperes to 50 amperes. The amount of fluctuation of the load current in the case illustrated in FIG. 3 is five times that in the case illustrated in FIG. 2. It is assumed that this fluctuation occurs at the timing of 0.4 seconds as described above. After this fluctuation has occurred, the DC voltage in the embodiment decreases suddenly from about 680 volts to about 650 volts as illustrated in the portion (b) of FIG. 3 with this fluctuation. The rate of fluctuation of the DC voltage from the initial-state voltage is about 4.4%. On the other hand, the DC voltage in the comparative example decreases suddenly to a value less than 630 volts. The rate of fluctuation of the DC voltage from the initial-state voltage in the comparative example is greater than 7.4%. In the comparative example, the time required until the rate of fluctuation of the DC voltage recovers to 5% or less is about 0.1 seconds.

As illustrated in the portion (c) of FIG. 3, the steady-state value of the active current changes from 0 amperes to 100 amperes. In the course of transition of the active current to the steady-state value, the active current in the comparative example has a trend of fluctuation to approach the steady-state value and the active current in the embodiment increases temporarily to about 120 amperes which is a peak value with the fluctuation of the load 2. The active current after the temporary peak value has been detected fluctuates to a value close to a value of the active current in the comparative example.

On the other hand, when the amount of fluctuation is the largest as illustrated in FIG. 4, a load current flowing in load 2 fluctuates stepwise from 0 amperes to 100 amperes. The amount of fluctuation of the load current in the case illustrated in FIG. 4 is ten times that in the case illustrated in FIG. 2. It is assumed that this fluctuation occurs at the timing of 0.4 seconds as described above. After this fluctuation has occurred, the DC voltage in the embodiment decreases suddenly from about 680 volts to about 630 volts as illustrated in the portion (b) of FIG. 4 with this fluctuation. The rate of fluctuation of the DC voltage from the initial-state voltage is about 7.4%. On the other hand, the DC voltage in the comparative example decreases suddenly to a value less than 590 volts. The rate of fluctuation of the DC voltage from the initial-state voltage in the comparative example is greater than 13.2%. In the comparative example, the time required until the rate of fluctuation of the DC voltage recovers to 5% or less is about 0.13 seconds. In the embodiment, the time required until the rate of fluctuation of the DC voltage recovers to 5% or less is merely 0.015 seconds.

As illustrated in the portion (c) of FIG. 4, the steady-state value of the active current changes from 0 amperes to about 200 amperes. In the course of transition of the active current to the steady-state value, the active current in the comparative example has a trend of fluctuation to approach the steady-state value and the active current in the embodiment increases temporarily to about 300 amperes which is a peak value with the fluctuation of load 2. The active current after the temporary peak value has been detected fluctuates to a value close to that in the comparative example.

According to the embodiment, the power converter 1 calculates a control difference between a target value V* for a target control voltage in the DC section provided on the output side of the converter 6 and a feedback value VDC_F using the DC voltage in the DC section as the feedback value VDC_F, and performs a nonlinear operation process on the control difference. The power converter 1 calculates an operation value based on the result of the nonlinear operation process and controls the converter 6 using the operation value. Accordingly, even when the load 2 of the inverter 8 fluctuates suddenly while the power converter 1 is operating, the DC voltage in the DC section on the output side of the converter 6 does not fluctuate greatly as in the comparative example and can be controlled such that it converges within a relatively short time.

For example, the power converter 1 acquires the result of the nonlinear operation process by feeding back the DC voltage VDC_F which is the output of the converter and multiplying a difference between the feedback value and a command value V* by an absolute value of the difference.

For example, the power converter 1 uses the result of the nonlinear operation process as an input value of PI control. In this case, the power converter 1 calculates an operation value based on the result of the nonlinear operation process through the PI control and controls the converter 6 using the operation value.

The input value of the voltage control unit 14 of the power converter 1 increases as the difference between the command value V* and the value of the DC voltage VDC_F increases. With this increase, the power converter 1 behaves as if a PI gain is higher. Accordingly, the power converter 1 responds more quickly and it is possible to curb fluctuation of the DC voltage.

The power converter 1 integrates the control difference $\Delta V1$ using a nonlinear operation process. In this integration, the value of the coefficient k which is multiplied by the control difference $\Delta V1$ can be determined such that the control difference $\Delta V1$ can be prevented from becoming an excessive value steadily.

Modified Examples of First Embodiment

The aforementioned embodiment may be applied to the following configurations.

A plurality of inverters may be connected to one converter 1. In this configuration, when loads of the inverters are independent, it may not be easy to control the converter such that an influence of fluctuation of the loads is reduced.

As a control method of a comparative example, a control method of feeding back an output of an inverter and controlling a converter using a feedback value thereof in order to curb an influence of fluctuation of a load is known. This control method may be referred to as power compensation. Even when this control method is applied to the aforementioned configuration, it is difficult to curb sudden fluctuation of the DC voltage due to fluctuation of the load.

On the other hand, with the control method according to the embodiment, it is possible to curb sudden fluctuation of the DC voltage.

Second Embodiment

A second embodiment will be described below with reference to FIGS. 5 to 7.

Figure 5:
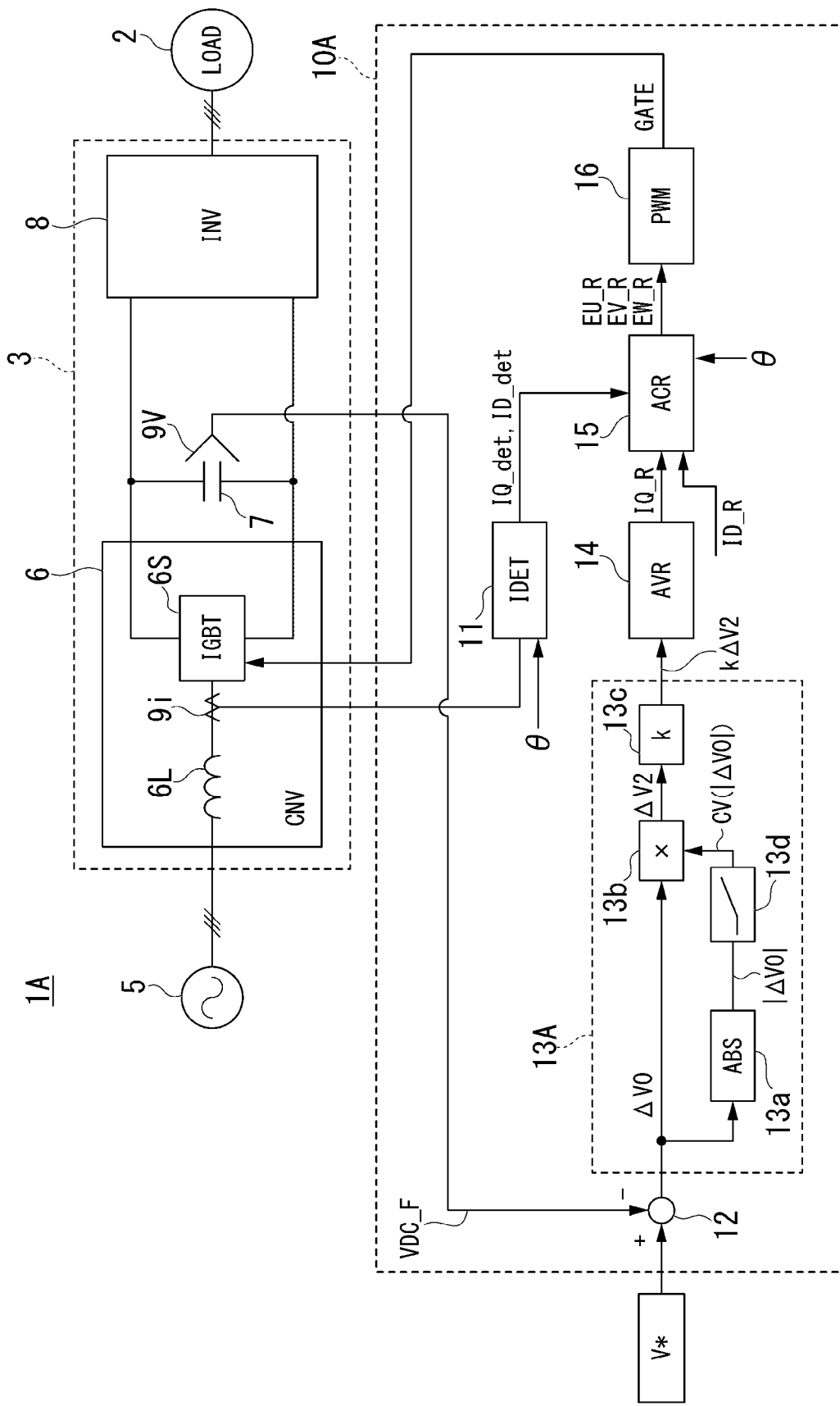
FIG. 5 is a diagram illustrating a configuration of a power converter according to a second embodiment.

FIG. 5 is a diagram illustrating a configuration of a power converter 1A according to the second embodiment. The power converter 1A includes a control unit 10A instead of the control unit 10 of the power converter 1. The control unit 10A includes a nonlinear operation unit 13A instead of the nonlinear operation unit 13 of the control unit 10. The nonlinear operation unit 13A further includes an operation unit 13d in comparison with the nonlinear operation unit 13.

The operation unit 13d is a limiter in which a lower limit LL with a predetermined value determined in advance is set. The operation unit 13d limits the absolute value $|\Delta V0|$ of the control difference $\Delta V0$ calculated by the operation unit 13a such that an output value thereof is not less than the lower limit LL. When the absolute value $|\Delta V0|$ of the control difference $\Delta V0$ is equal to or greater than the lower limit LL, the operation unit 13d outputs the absolute value $|\Delta V0|$ of the control difference $\Delta V0$ without any change. When the absolute value $|\Delta V0|$ of the control difference $\Delta V0$ is less than the lower limit LL, the operation unit 13d outputs the value of the lower limit LL instead of the absolute value $|\Delta V0|$ of the control difference $\Delta V0$. The value output from the operation unit 13d is referred to as $CV(|\Delta V0|)$. The operation unit 13b calculates a control difference $\Delta V2$ by multiplying the control difference $\Delta V0$ by $CV(|\Delta V0|)$ using the control difference $\Delta V0$ and $CV(|\Delta V0|)$ as input variables. The operation unit 13c calculates a control difference $k\Delta V2$ by multiplying the control difference $\Delta V2$ by a coefficient k of which the value is determined in advance. This operation process is arranged in Equations (3) to (5).

$$CV(|\Delta V0|)=|\Delta V0| \text{ (if } LL \leq |\Delta V0|) \text{ or } LL \text{ (if } LL>|\Delta V0|) \quad (3)$$

$$\Delta V2 = CV(|\Delta V0|) \times \Delta V0 \quad (4)$$

$$k\Delta V2 = k \times \Delta V2 \quad (5)$$

Figure 6:
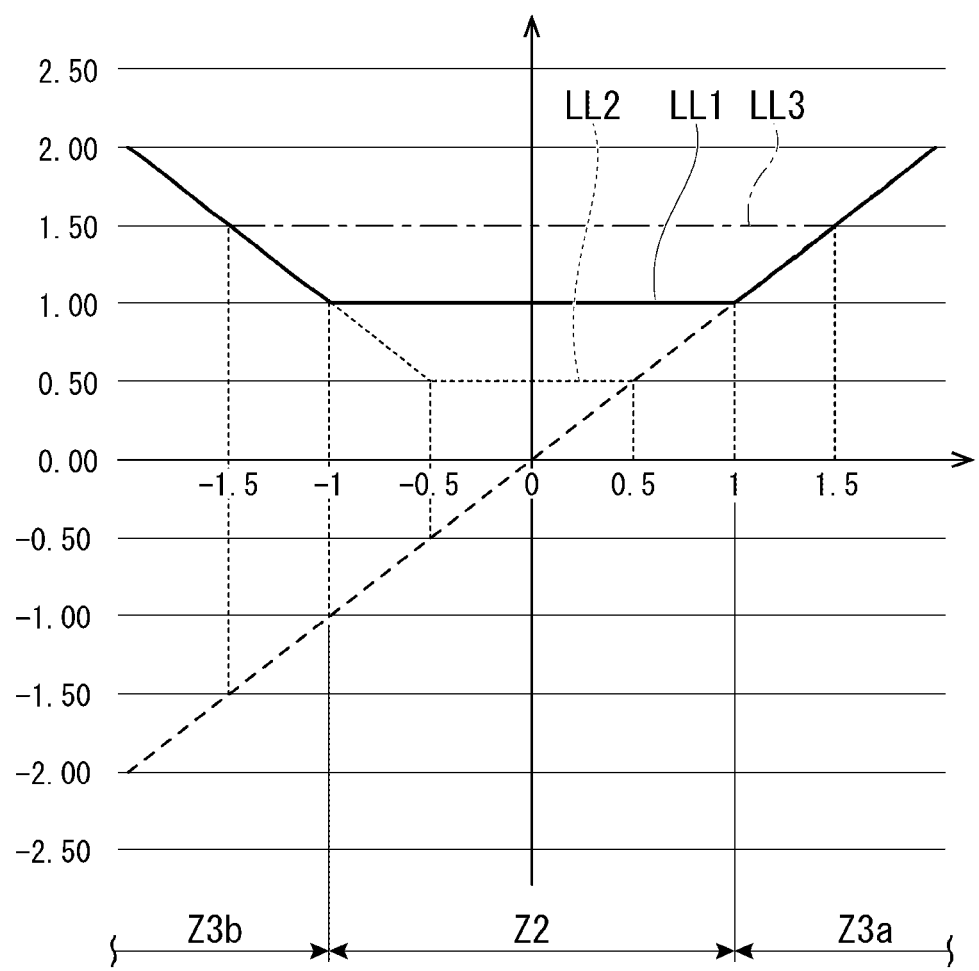
FIG. 6 is a diagram illustrating a nonlinear operation process according to the second embodiment.
Figure 7:
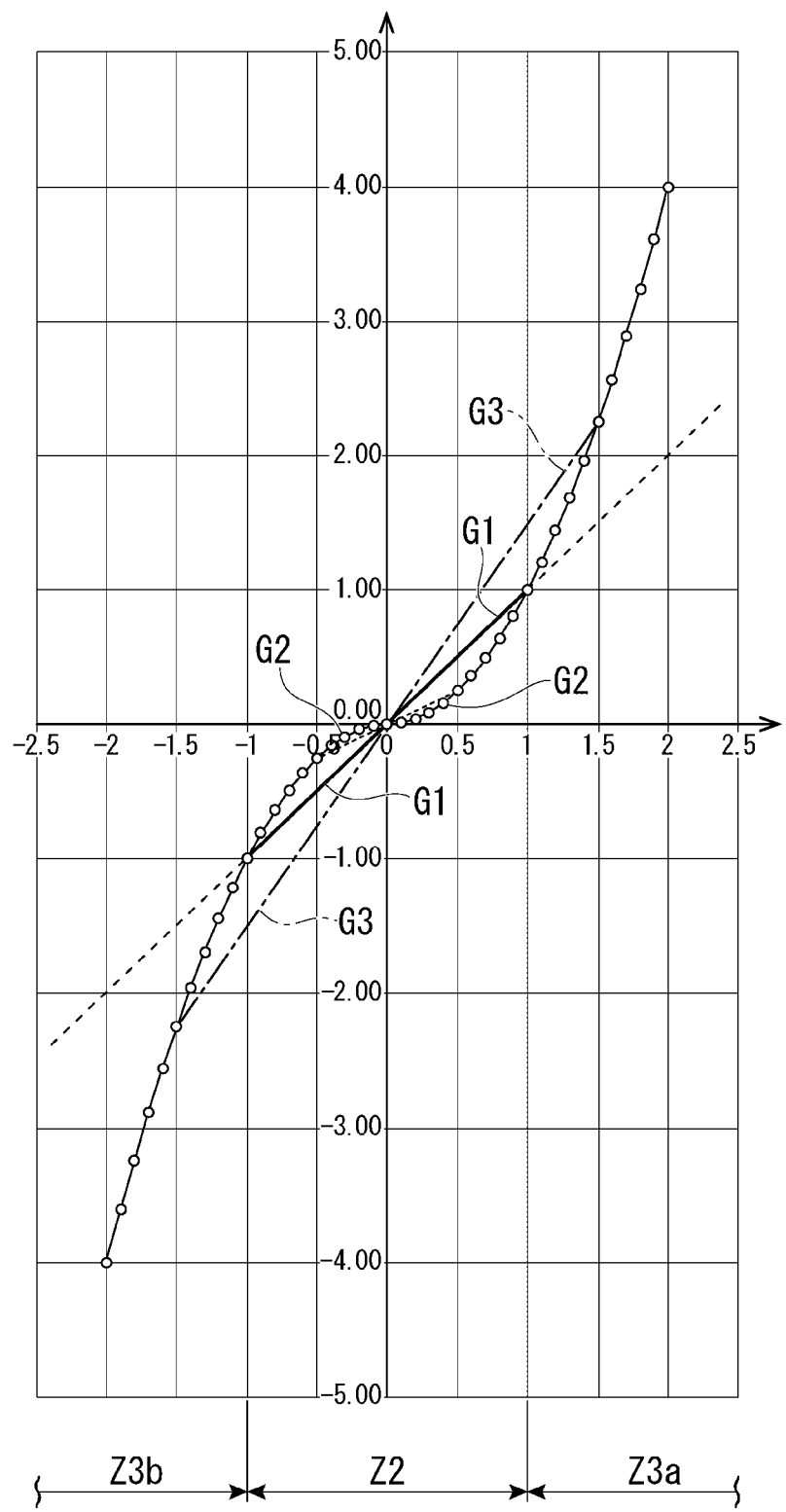
FIG. 7 is a diagram illustrating a nonlinear operation process according to the second embodiment.

FIGS. 6 and 7 are diagrams illustrating a nonlinear operation according to the second embodiment.

FIG. 6 illustrates three cases in which the values of the lower limit LL of $CV(|\Delta V0|)$ are different. In the graph LL1, the value of the lower limit LL is 1. In the graph LL2, the value of the lower limit LL is, for example, a representative value between 0 and 1. In the graph LL3, the value of the lower limit LL is, for example, a representative value greater than 1.

In FIG. 7, control differences $\Delta V2$ corresponding to the three cases illustrated in FIG. 6 are illustrated. The graph G1 represents characteristics when the value of the lower limit LL corresponding to the graph LL1 is 1. The graph G2 represents characteristics when the value of the lower limit LL corresponding to the graph LL2 is a value between 0 and 1. The graph G3 represents characteristics when the value of the lower limit LL corresponding to the graph LL3 is greater than 1.

Although not illustrated, characteristics of the control differences $\Delta V2$ represented by the graphs illustrated in FIG. 7 can be extended or contracted in an amplitude direction by multiplying the control difference $\Delta V2$ illustrated in FIG. 7 by the coefficient k. By independently setting the lower limit LL and the value of the coefficient k, linearity of the graphs illustrated in FIG. 7 is maintained.

According to this embodiment, the control unit 10A limits the absolute value $|\Delta V0|$ of the control difference $\Delta V0$ to the predetermined lower limit LL through the nonlinear operation process on the control difference $\Delta V0$ and uses a product of $CV(|\Delta V0|)$ (an absolute value with a lower limit of the control difference) which is limited to the lower limit LL according to the absolute value $|\Delta V0|$ of the control difference $\Delta V0$ and the control difference $\Delta V0$ as the result of the nonlinear operation process.

As the nonlinear operation process on the control difference $\Delta V0$, the control unit 10A generates a first result through linear conversion of the control difference $\Delta V0$ in a range in which the absolute value $|\Delta V0|$ of the control difference $\Delta V0$ is less than the lower limit LL with a predetermined magnitude (for example, a range Z2 in the graph illustrated in FIG. 6). The control unit 10A generates a second result through nonlinear conversion of the control difference in a range in which the absolute value $|\Delta V0|$ of the control difference $\Delta V0$ is greater than the lower limit LL (for example, a range Z3a and Z3b in the graph illustrated in FIG. 6), and uses a combination of the first result and the second result as the result of the nonlinear operation process.

The control unit 10A will be described below from a point of view different from the above description. As illustrated in FIG. 7, the control unit 10A generates a control difference $\Delta V2$ (the first result) based on linear approximation of the control difference $\Delta V0$ in a range Z2 in which the absolute value $|\Delta V0|$ of the control difference $\Delta V0$ is less than the lower limit LL as the nonlinear operation process on the control difference $\Delta V0$.

The control unit 10A generates a control difference $\Delta V2$ (the second result) based on a high-order function of the control difference $\Delta V0$ in a range in which the absolute value $|\Delta V0|$ of the control difference $\Delta V0$ is greater than the lower limit, and uses a combination of the first result and the second result as the result of the nonlinear operation process.

The control unit 10A acquires the control difference $\Delta V2$ by first performing an operation of limiting the absolute value $|\Delta V0|$ of the control difference $\Delta V0$ to the lower limit LL and then multiplying the operation result by the control difference ΔV0. Accordingly, a calculation expression is changed at the lower limit LL, but continuity in the value of the control difference ΔV2 at the lower limit LL is secured. The control unit 10A includes discontinuous control in a feedback control loop, but can be configured such that sudden change of a loop gain of the feedback control loop is not generated because continuity at the lower limit LL is secured as described above.

According to at least one of the aforementioned embodiments, the power converter 1 includes a converter 6, an inverter 8, and a control unit 10. The converter 6 converts electric power which is supplied from a power supply 5 side to DC power. The inverter 8 is provided on an output side of the converter 6. The control unit 10 calculates a control difference between a target value of a DC voltage in a DC section provided on the output side of the converter 6 and a feedback value using the DC voltage in the DC section as the feedback value, and performs a nonlinear operation process on the control difference. The control unit 10 calculates an operation value based on the result of the nonlinear operation process and controls the converter 6 using the operation value. Accordingly, it is possible to reduce fluctuation of the DC voltage on the output side of the converter 6 due to fluctuation of the load of the inverter 8.

At least a part of the power converter 1 may be realized by software functional units that operate by causing a processor such as a CPU to execute a program or the whole power converter 1 may be realized by hardware functional units such as LSI.

While some embodiments of the invention have been described, the embodiments are described as examples and are not intended to limit the scope of the invention. These embodiments can be embodied in various forms and various omissions, substitutions, and modifications can be performed thereon. These embodiments or modifications thereof are included in the scope or gist of the invention and are also included in the invention described in the appended claims and the scope equivalent thereto.

REFERENCE SIGNS LIST

1 Power converter
2 Load
3 Main circuit
5 Power supply
6 Converter
8 Inverter
9V Voltage sensor
9i Current sensor
10 Control unit

The invention claimed is:

1. A power converter comprising:
a converter that converts electric power supplied from a power supply side to DC power;
an inverter that is provided on an output side of the converter; and
a control unit configured to
calculate a control difference between a target value for a target control voltage in a DC section provided on the output side of the converter and a feedback value using a DC voltage of the DC section as the feedback value,
perform a nonlinear operation process on the control difference including a linear conversion to the control difference in a range where an absolute value of the control difference is less than a predetermined magnitude and a non-linear conversion to the control difference in a range where the absolute value of the control difference exceeds the predetermined magnitude, and
calculate an operation value based on a result of the nonlinear operation process and control the converter using the operation value.

2. The power converter according to claim 1, wherein the control unit limits the absolute value of the control difference to a predetermined lower limit through the nonlinear operation process performed on the control difference and calculates a product of the absolute value with the lower limit of the control difference limited to the lower limit based on the magnitude of the absolute value of the control difference and the control difference as a result of the nonlinear operation process.

3. The power converter according to claim 1, wherein the control unit generates a first result through linear conversion performed on the control difference in a range in which the absolute value of the control difference is less than the predetermined magnitude and generates a second result through non-linear conversion performed on the control difference in a range in which the absolute value of the control difference is greater than the predetermined magnitude as the nonlinear operation process performed on the control difference, and sets a combination of the first result and the second result as a result of the nonlinear operation process.

4. The power converter according to claim 1, wherein the control unit generates a first result through linear approximation performed on the control difference in a range in which the absolute value of the control difference is less than the predetermined magnitude and generates a second result through a high-order function performed on the control difference in a range in which the absolute value of the control difference is greater than the predetermined magnitude as the nonlinear operation process performed on the control difference, and sets a combination of the first result and the second result as a result of the nonlinear operation process.

5. A power conversion controller for a power converter including a converter that converts electric power supplied from a power supply side to DC power and an inverter that is provided on an output side of the converter, the power conversion controller comprising a control unit configured to:
calculate a control difference between a target value for a target control voltage in a DC section provided on the output side of the converter and a feedback value using a DC voltage of the DC section as the feedback value;
perform a nonlinear operation process on the control difference including a linear conversion to the control difference in a range where an absolute value of the control difference is less than a predetermined magnitude and a non-linear conversion to the control difference in a range where the absolute value of the control difference exceeds the predetermined magnitude; and
calculate an operation value based on a result of the nonlinear operation process and control the converter using the operation value.

6. A control method for a power converter including a converter that converts electric power supplied from a power supply side to DC power and an inverter that is provided on an output side of the converter, the control method comprising:
calculating a control difference between a target value for a target control voltage in a DC section provided on the output side of the converter and a feedback value using a DC voltage of the DC section as the feedback value;

performing a nonlinear operation process on the control difference including a linear conversion to the control difference in a range where an absolute value of the control difference is less than a predetermined magnitude and a non-linear conversion to the control difference in a range where the absolute value of the control difference exceeds the predetermined magnitude; and calculating an operation value based on a result of the nonlinear operation process and controlling the converter using the operation value.

\* \* \* \* \*